United States Patent [19]

Jansen et al.

[11] Patent Number: 5,585,046
[45] Date of Patent: Dec. 17, 1996

[54] COLUMN FOR PERFORMING THERMAL SEPARATIONS AND/OR CHEMICAL REACTIONS

[75] Inventors: Helmut Jansen, Dormagen; Jochen Leben, Düsseldorf; Thomas Rietfort, Bottrop; Egon Zich, Leichlingen, all of Germany

[73] Assignee: Julius Montz GmbH, Hilden, Germany

[21] Appl. No.: 330,715

[22] Filed: Oct. 28, 1994

[30] Foreign Application Priority Data

Oct. 29, 1993 [DE] Germany ............ 43 36 985.5

[51] Int. Cl.⁶ .................. B01D 47/16; F02M 17/28; F02M 29/04
[52] U.S. Cl. .................. 261/97; 261/DIG. 77; 422/275; 422/276
[58] Field of Search .................. 422/191, 211, 422/212, 273, 275, 276; 55/233; 210/320; 261/94, 95, 100, 101, DIG. 77, 97

[56] References Cited

U.S. PATENT DOCUMENTS

| | | | |
|---|---|---|---|
| 3,430,934 | 3/1969 | Weishaupt | 261/94 |
| 4,576,763 | 3/1986 | Nutter | 261/94 |
| 4,600,544 | 7/1986 | Mix | 261/79 |
| 4,929,398 | 5/1990 | Pedersen | 261/94 |
| 4,985,182 | 1/1991 | Basse et al. | 261/94 |
| 5,188,772 | 2/1993 | Yui | 261/94 |
| 5,304,328 | 4/1994 | Dolan | 261/94 |
| 5,314,645 | 5/1994 | Rukovena | 261/94 |
| 5,372,752 | 12/1994 | Bosman | 261/100 |
| 5,411,681 | 5/1995 | Seah et al. | 261/94 |

FOREIGN PATENT DOCUMENTS

| | | |
|---|---|---|
| 0126288 | 11/1984 | European Pat. Off. . |
| 2364739 | 7/1975 | Germany . |

OTHER PUBLICATIONS

"Equilibrium Stage Sep. . . Chem. Eng", pp. 59–61 John Wiley & Sons Copyright 1981.
"Handbook of Separation Techniques. . . Engineers", pp. I–238–I–241, McGraw–Hill Copyright 1980.
** Kolev N.; et al: Lässt sich die Randgängikeit in Füllköperkolonnen beseitigen?: Verfahrenstechnik 13, 1979, No. 3, pp. 164–166.

Primary Examiner—N. Bhat
Attorney, Agent, or Firm—Herbert Dubno

[57] ABSTRACT

A column for performing thermal separations includes a vertical cylindrical outer column wall defining an inner volume which is subdivided by a separating wall into two halves filled with mass exchange packs, each of the mass packs has horizontal strip-like two rim guards, a lower guard is interrupted in the area of opposite corners of the respective mass exchange pack and an upper rim guard is a continuous flexible fabric strip.

3 Claims, 3 Drawing Sheets

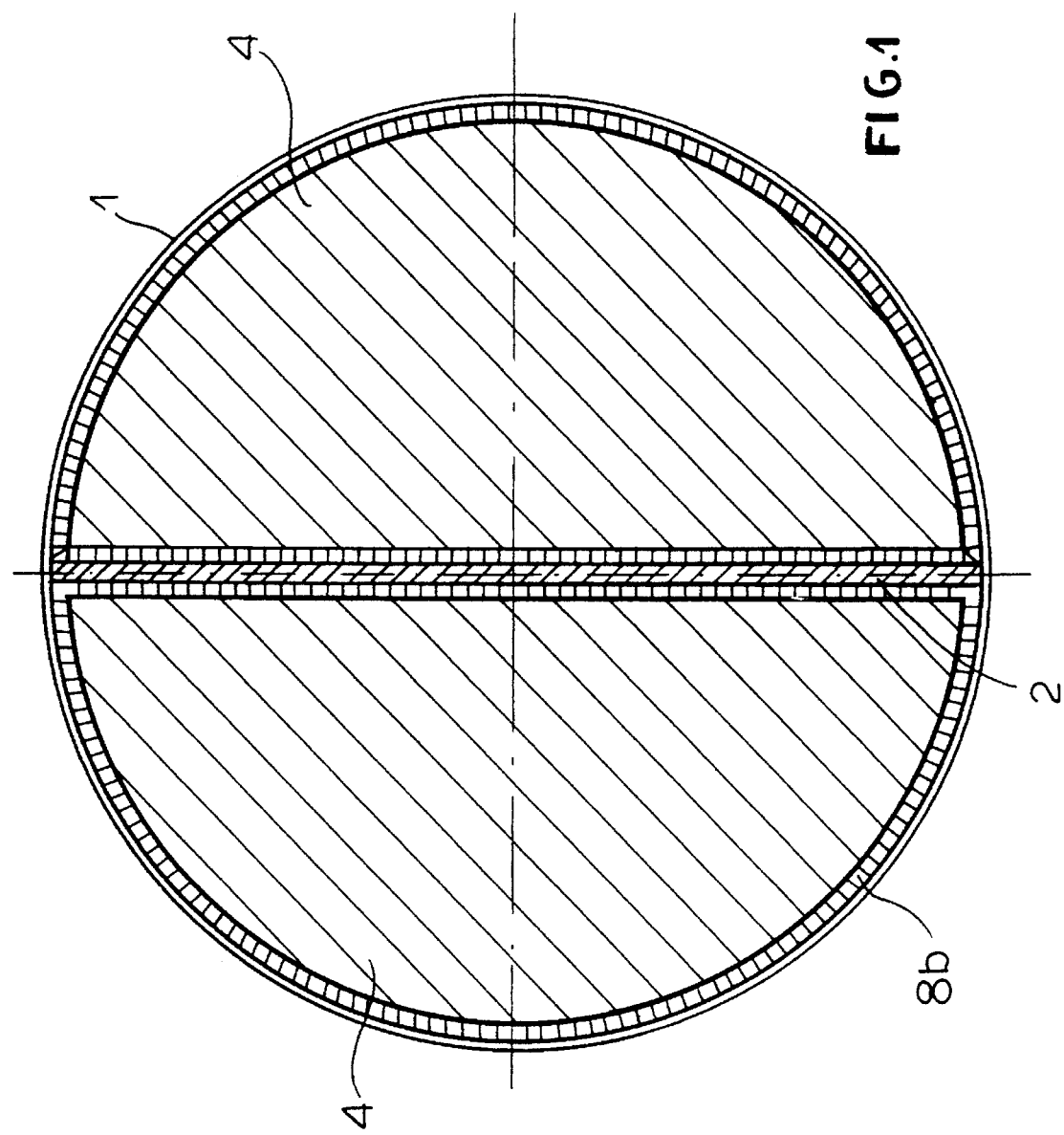

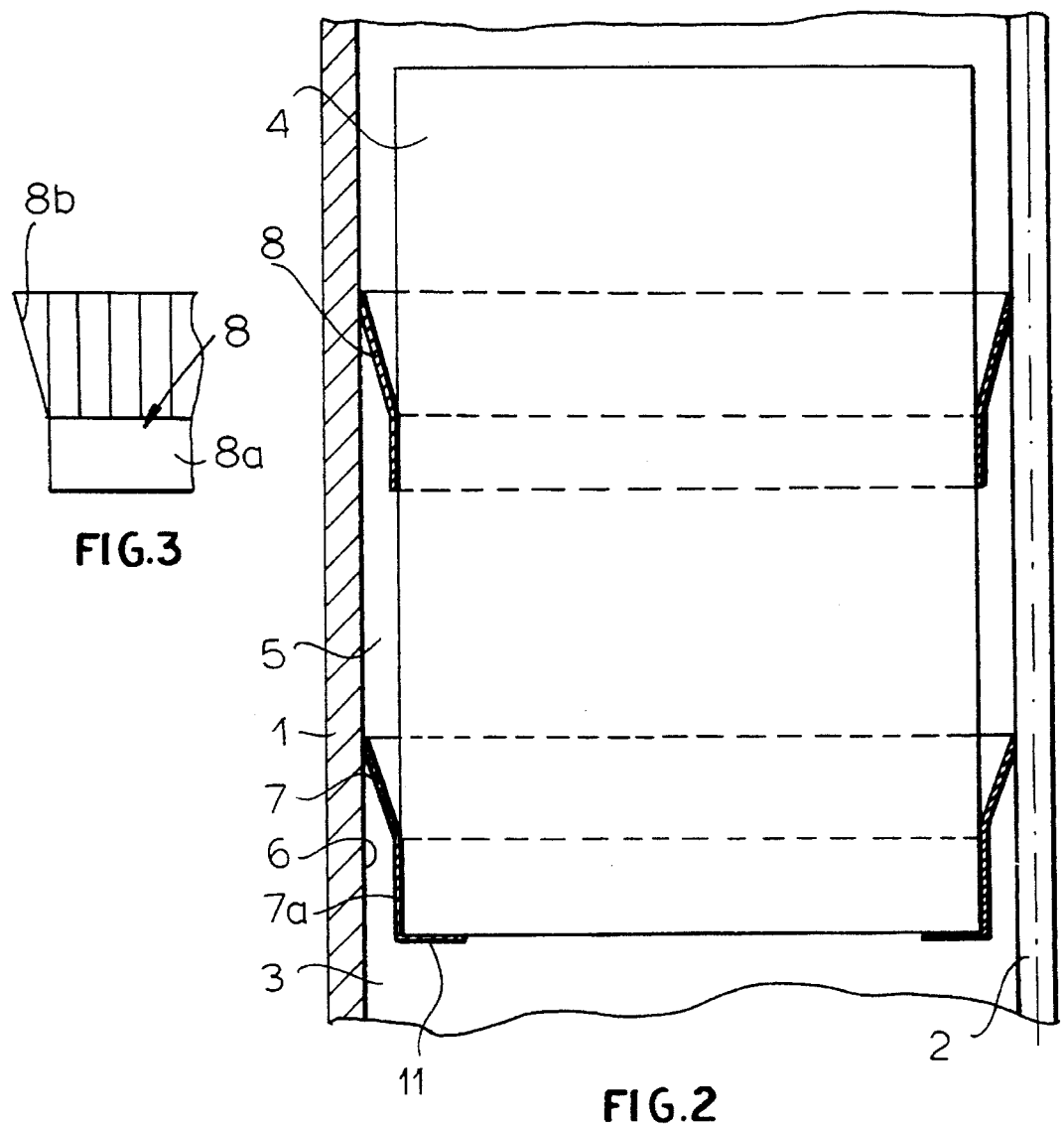
FIG.3
FIG.2
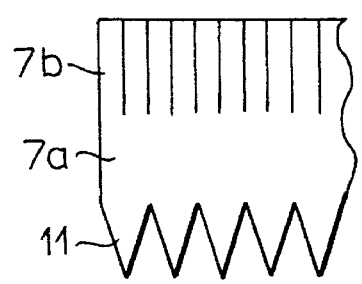
FIG.4
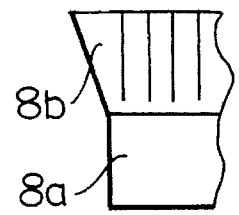
FIG.5

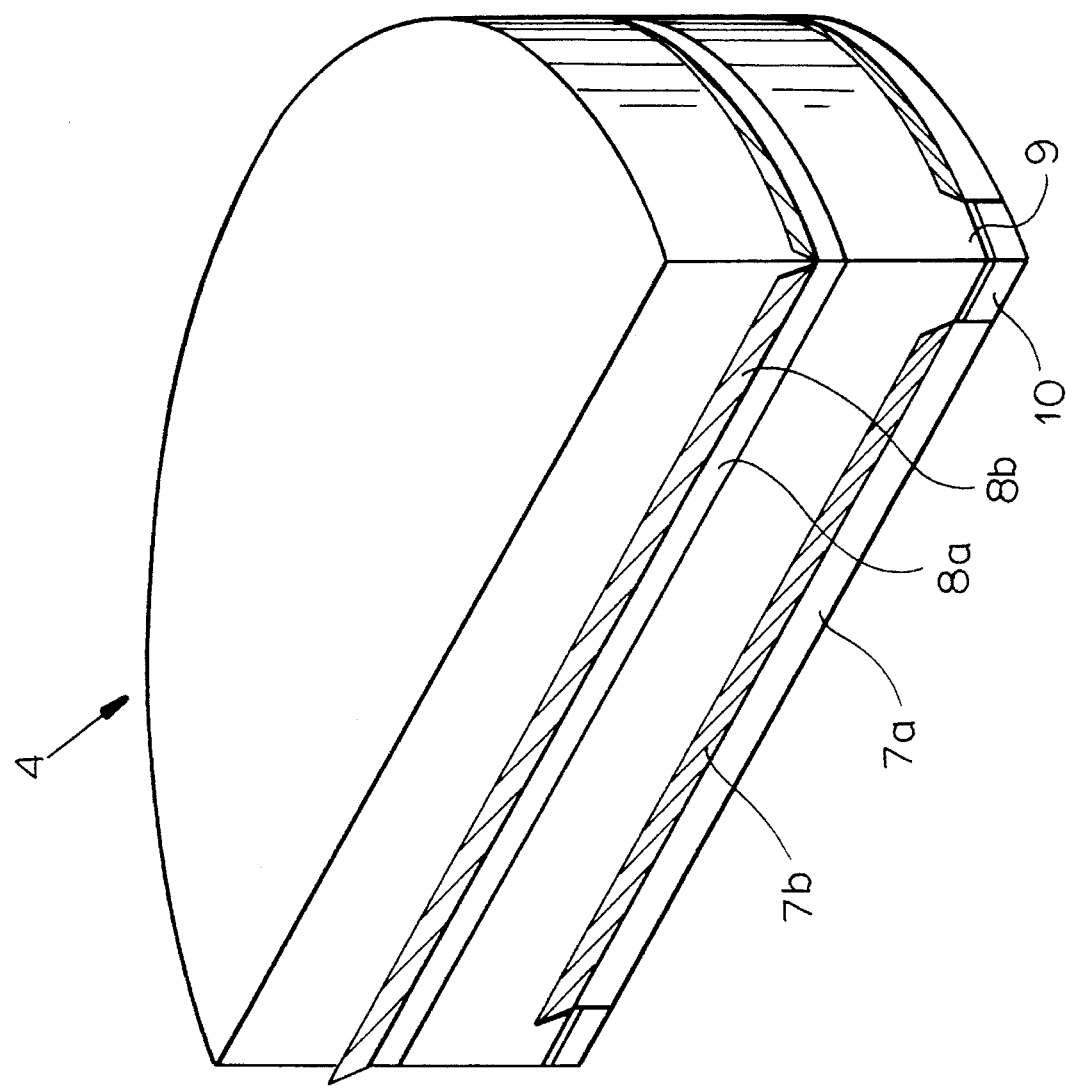

5,585,046

COLUMN FOR PERFORMING THERMAL SEPARATIONS AND/OR CHEMICAL REACTIONS

FIELD OF THE INVENTION

The invention relates to a column for performing thermal separations and/or chemical reactions having a vertical cylindrical outer column wall surrounding an inner volume.

BACKGROUND OF THE INVENTION

It is known to provide mass exchange packs in a column all around with rim guards which guide the liquid running down the inner column wall towards the mass exchange packings. The fastening of the rim guards is relatively problem-free when the mass exchange packing is circular at its periphery. But when the mass exchange pack has a corner on the outside, such as is the case when an inner separating wall is arranged, then a rim guard of rigid material is very hard to bend in the corner area.

OBJECTS OF THE INVENTION

It is the object of the invention to improve a column of the aforementioned kind so that rim guards can be easily and simply fastened in a corner area of the mass exchange packs. Still another object is to provide a simple mounting of the rim guards.

SUMMARY OF THE INVENTION

According to the invention this object is achieved in that two rim guards are fastened to the mass exchange pack which is subdivided by a median separating wall (separating plate) into two volume halves, wherein mass exchange packs (packings) are arranged, provided on the outside with horizontal strip-shaped rim guards which guide the liquid running along the inside of the outer column wall towards the mass exchange packs. The lower one of the two rim guards is interrupted in the corner area of the mass exchange pack, and the upper rim guard located above is made of a flexible fabric strip and runs continuously in the area where the lower rim guard is interrupted.

The lower rim guard precisely centers the mass exchange pack. In this type of construction the lower rim guard is particularly easy to mount, since it is not bent around the corner and therefore can be made of a relatively inflexible sheet metal strip. The flexible or fabric rim guard is fully drawn around the pack and closes all gaps. Thereby liquid flow occuring in the wedge between the separating plate and the column wall is not strong. The gap existing in the lower rim guard does no damage, since it is covered by the upper rim guard, so that no downwards running liquid is missed by the two rim guards.

It is thereby particularly advantageous when the fabric strip of the upper rim guard is a wire web. A particularly simple fastening of the lower sheet-metal strip is achieved when the two ends of the lower rim guard are fastened to each other by a strip, especially a metal-web strip.

BRIEF DESCRIPTION OF THE DRAWING

The above and other objects, features and advantages of the present invention will become more readily apparent from the following description, reference being made to the accompanying drawing in which:

FIG. 1 is a horizontal section through a column with separating wall;

FIG. 2 a vertical section through the column;

FIG. 3 is a partial vertical view of the upper rim guard;

FIG. 4 a partial vertical view of the lower rim guard in a nonfastened state;

FIG. 5 a partial vertical view of the lower rim guard in a fastened state; and

FIG. 6 a perspective view of the mass exchange pack (packing).

SPECIFIC DESCRIPTION

The packing element has an outer column formed with wall 1 in the shape of a vertical cylinder. The inner volume is divided by a median vertical, diametrical separating wall 2 in two equally large volume halves 3 and in each volume half at least one mass exchange packing 4 is arranged, whose outside forms with the inside 6 of the outer wall 1 an all around well defined rim gap 5 of approximately 3 to 30 mm.

In order to prevent the liquid from running along the inner side 6 without reaching the mass exchange packing, on the outside of the mass exchange packing 4 two rim guards 7, 8 are fastened, which direct the liquid flowing along towards the mass exchange packing.

Thereby each rim guard has a lower region 7a, 8a, which is fastened to the outside of the mass exchange packing. The upper rim 7b, 8b of the rim guards is bent outwardly at an angle and rests with its upper rim against the inner wall of the outer column wall 1.

The lower rim guard 7 consists of a sheet metal strip with small pointed tongs 11 adjacent to its lower region and which are bent over the lower outer edge of the mass exchange packs and are fastened to the underside of the mass exchange pack.

Since the material of the sheet metal strip can only be bent with difficulty around the corner of the mass exchange pack 4, the strip extremities end before reaching the corner of the mass exchange pack 4, so that the band ends form there an interruption 9, respectively a gap. This gap is bridged by a flexible fastening strip of metallic web 10, which is fastened to both ends of the rim guard and bends around the corner of the mass exchange pack.

The upper rim guard 8 consists of a flexible wire-web strip, which surrounds the mass exchange pack horizontally and thereby parallelly with respect to the lower rim guard 7. The upper rim guard 8 runs continuously over the corners of the mass exchange pack 4, so that it bridges there over the gaps in the lower rim guard 7.

We claim:

1. A column assembly comprising:

a cylindrical outer column extending along a vertical axis and formed with an inner surface defining an inner space;

a separating wall extending vertically in a plane of said axis and subdividing said inner space into two halves;

two mass exchange packs each in a respective one of the halves, each of said packs having a respective periphery and being formed with:

a respective outer convex face and juxtaposed with the inner surface of said column, a respective inner side facing the separating wall and meeting the outer face at opposite edges, a respective endless upper flexible rim guard belting the respective periphery and lying in an upper horizontal plane which extends perpendicular to said vertical axis, and a respective lower rim guard lying in a lower horizontal plane parallel to the upper horizontal plane and including a first rim guard part mounted on the outer face and a second rim guard part on the inner face of the respective periphery of each mass exchange pack, each of the first and second rim guard parts terminating at a distance from the respective edges and extending angularly downwardly and inwardly from the inner surface of said column and said separating wall toward the respective face of the mass pack.

2. The assembly defined in claim 1 wherein the upper rim guards are made of wire mesh.

3. The assembly defined in claim 1 wherein first and second rim guard parts of each lower rim are connected with one another by a respective fabric strip cornering the edges.

* * * * *